United States Patent
Chen et al.

(10) Patent No.: US 9,588,361 B2
(45) Date of Patent: Mar. 7, 2017

(54) OPTICAL ISOLATOR

(71) Applicant: Huawei Technologies Co., Ltd., Shenzhen, Guangdong (CN)

(72) Inventors: Jian Chen, Wuhan (CN); Zhiguang Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/046,646

(22) Filed: Feb. 18, 2016

(65) Prior Publication Data

US 2016/0161772 A1    Jun. 9, 2016

Related U.S. Application Data

(63) Continuation of application No. PCT/CN2013/081774, filed on Aug. 9, 2013.

(51) Int. Cl.
| | |
|---|---|
| *G02B 6/00* | (2006.01) |
| *G02F 1/095* | (2006.01) |
| *G02F 1/00* | (2006.01) |
| *H01F 10/193* | (2006.01) |

(52) U.S. Cl.
CPC .......... *G02F 1/0955* (2013.01); *G02F 1/0036* (2013.01); *H01F 10/193* (2013.01)

(58) Field of Classification Search
CPC ......... G02F 1/0036; G02B 2006/12097; H01F 10/193
USPC .............. 385/11; 359/34.1; 438/29; 977/755
See application file for complete search history.

(56) References Cited

U.S. PATENT DOCUMENTS

| | | | | |
|---|---|---|---|---|
| 5,408,565 A * | 4/1995 | Levy | ..................... | G02F 1/0955 385/130 |
| 5,598,492 A * | 1/1997 | Hammer | ............... | G02F 1/0955 257/63 |
| 6,785,037 B2 * | 8/2004 | Matsushita | ............... | G02F 1/09 359/280 |
| 7,146,074 B2 * | 12/2006 | Zheng | ..................... | G02B 6/42 385/12 |
| 7,260,281 B2 * | 8/2007 | Salib | ................... | G02B 6/2746 359/484.03 |
| 7,826,690 B2 * | 11/2010 | Nakajima | ............. | G02F 1/0955 385/6 |

(Continued)

FOREIGN PATENT DOCUMENTS

| | | |
|---|---|---|
| CN | 1318878 A | 10/2001 |
| CN | 1869748 A | 11/2006 |

(Continued)

OTHER PUBLICATIONS

V. Zayets et al., "Isolation effect in ferromagnetic-metal/semiconductor hybrid optical waveguide", Applied Physics Letters, vol. 86, No. 26, Jun. 20, 2005, 3 pages.

*Primary Examiner* — Ellen Kim

(57) ABSTRACT

The present disclosure provides an optical isolator which includes a planar lightwave circuit, a magneto-optic thin film and a metal thin film with a magnetic field. A channel for transmitting an optical signal is configured in the planar lightwave circuit. The magneto-optic thin film is disposed on the planar lightwave circuit, and a plane on which the magneto-optic thin film is located is parallel to the channel. The metal thin film is disposed on the magneto-optic thin film.

9 Claims, 2 Drawing Sheets

(56) References Cited

U.S. PATENT DOCUMENTS

| | | | | |
|---|---|---|---|---|
| 8,335,407 B2* | 12/2012 | Yokoi | ............... | G02B 6/132 |
| | | | | 385/14 |
| 2002/0008596 A1 | 1/2002 | Watanabe et al. | | |
| 2005/0089263 A1 | 4/2005 | Wessel et al. | | |
| 2007/0230858 A1 | 10/2007 | Salib et al. | | |
| 2009/0023237 A1 | 1/2009 | Mizumoto et al. | | |
| 2011/0019957 A1* | 1/2011 | Alameh | ............... | G02F 1/095 |
| | | | | 385/6 |
| 2014/0010509 A1* | 1/2014 | Zayets | ............... | G02B 6/10 |
| | | | | 385/131 |
| 2014/0247477 A1* | 9/2014 | Duan | ............... | G02F 1/0955 |
| | | | | 359/341.1 |

FOREIGN PATENT DOCUMENTS

| | | |
|---|---|---|
| CN | 101375190 A | 2/2009 |
| CN | 101672987 A | 3/2010 |
| CN | 102659070 A | 9/2012 |
| JP | 11352345 A | 12/1999 |
| JP | 2000171650 A | 6/2000 |
| JP | 2000258740 A | 9/2000 |
| WO | WO 2010/093783 A2 | 8/2010 |

\* cited by examiner

OPTICAL ISOLATOR

CROSS-REFERENCE TO RELATED APPLICATIONS

This is a continuation of International Patent Application No. PCT/CN2013/081774, filed on Aug. 19, 2013, which is hereby incorporated herein by reference in its entirety.

TECHNICAL FIELD

The present application relates to the field of optical communications, and in particular, to an optical isolator.

BACKGROUND

An optical isolator is an optical element that enables light to be transmitted in one direction and disables the light to be transmitted in a reverse direction. For example, after the optical isolator is disposed on an emission end of a semiconductor laser, light emitted from the laser passes through the optical isolator and can be used as a light source used for optical communications. On the contrary, light that is about to be incident to the semiconductor laser through the optical isolator is stopped by the optical isolator, and cannot be incident to the semiconductor laser. If the optical isolator is not disposed on the emission end of the semiconductor laser, reflected light is incident to the semiconductor laser, causing that an oscillation characteristic of the semiconductor laser deteriorates; output intensity varies (generating an intensity noise); an oscillation wavelength changes (generating a phase noise); and the like.

Not only for the semiconductor laser, but also for an active element such as an optical amplifier, unexpected light reflection also causes degradation of working characteristics of the active element. To avoid this phenomenon, the optical isolator needs to be configured on an output end of the semiconductor laser or the active element to avoid occurrence of the undesirable phenomenon in the semiconductor laser or the active element. Especially, when the semiconductor laser is used as a light source used for high-speed optical fiber communications, oscillation stability of the light source is an absolute condition. Therefore, the optical isolator must be used.

Currently, most of optical isolators on the market are classical optical isolators, for example, Faraday magnetic-optic rotation crystal-type optical isolators and birefringence crystal-type optical isolators, and these classical optical isolators are used for encapsulation of a coaxial optoelectronic device. Compared with an optoelectronic device such as a planar lightwave circuit (PLC), the classical optical isolators are not easily integrated or encapsulated for main reasons that sizes of the classical optical isolators are relatively large and the classical optical isolators need to be placed perpendicular to a light propagation direction, which increases an encapsulation size of a device. Moreover, materials of the classical optical isolators are different from those of PLC optoelectronic devices and have more insertion losses.

SUMMARY

Embodiments of the present invention provide an optical isolator for isolating a transmitted optical signal.

An embodiment of the present invention provides an optical isolator, including a planar lightwave circuit, a magneto-optic thin film, and a metal thin film with a magnetic field. A channel for transmitting an optical signal is disposed in the planar lightwave circuit. The magneto-optic thin film is disposed on the planar lightwave circuit, and a plane on which the magneto-optic thin film is located is parallel to the channel for transmitting an optical signal. The metal thin film with a magnetic field is disposed on the magneto-optic thin film.

The planar lightwave circuit includes three layers: a cladding, a core layer, and a substrate. The core layer is located between the cladding and the substrate, and the core layer is the channel for transmitting an optical signal.

As an implementation manner, the metal thin film with a magnetic field is a ferromagnetic metal thin film.

As an implementation manner, the metal thin film with a magnetic field includes a metal thin film and a permanent-magnet thin film. The metal thin film is disposed on the magneto-optic thin film, and the permanent-magnet thin film is disposed on the metal thin film.

Constituent materials of the metal thin film include one or more of gold, silver and copper.

As an implementation manner, the planar lightwave circuit (10) is made of silica.

As an implementation manner, constituent materials of the planar lightwave circuit include one or more of lithium niobate ($LiNbO_3$), III-V semiconductor compound, silicon on an insulator, silicon oxynitride (SiON) and high molecular polymer.

The III-V semiconductor compound includes one or more of InP and GaAs.

As an implementation manner, a dielectric grating is disposed in the channel for transmitting an optical signal.

A dielectric grating is disposed at the core layer.

An optical isolator according to the embodiments of the present invention enables an optical signal transmitted in a forward direction to be transmitted smoothly in a PLC, and disables an optical signal transmitted in a reverse direction to be transmitted in the PLC, thereby implementing a function of isolating light.

DETAILED DESCRIPTION

Figure 1:
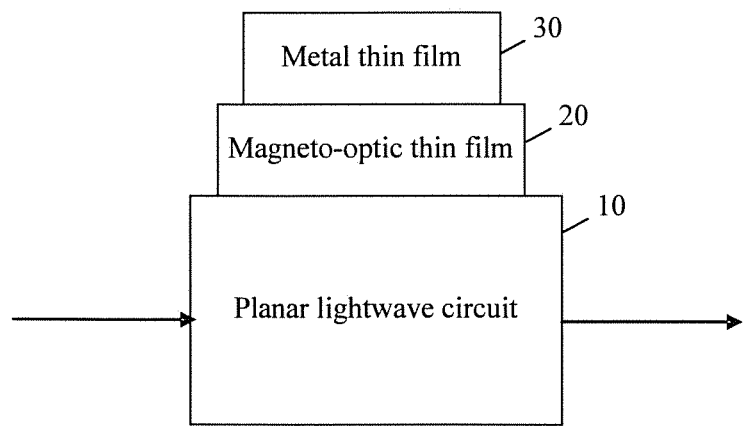
FIG. 1 is a schematic structural diagram of an optical isolator according to an embodiment of the present invention.

An embodiment of the present invention provides an optical isolator. As shown in FIG. 1, the optical isolator includes a planar lightwave circuit (PLC) 10, a magneto-optic thin film 20, and a metal thin film 30 with a magnetic field. A channel for transmitting an optical signal is disposed in the PLC 10. The magneto-optic thin film 20 is disposed on the PLC 10, and a plane on which the magneto-optic thin film 20 is located is parallel to the channel for transmitting the optical signal in the PLC 10. The metal thin film 30 with a magnetic field is disposed on the magneto-optic thin film 20.

The material of the PLC 10 may be silica, or consists of one or more of lithium niobate (LiNbO$_3$), III-V semiconductor compound, silicon on an insulator, silicon oxynitride (SiON), and high molecular polymer. The III-V semiconductor compound may include one or more of InP and GaAs. The PLC 10 has a very wide range of constituent materials, and the foregoing merely lists some common materials.

Figure 2:
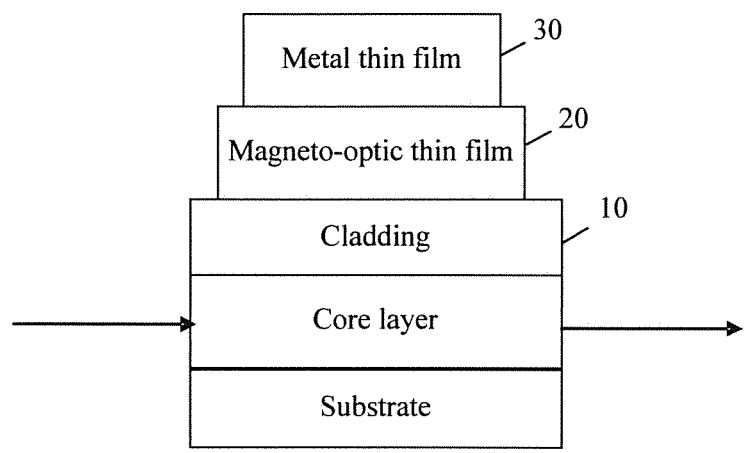
FIG. 2 is a schematic structural diagram of an optical isolator according to an embodiment of the present invention.

As an implementation manner, the PLC 10 includes three layers, i.e., a cladding, a core layer and a substrate. As shown in FIG. 2, the core layer is sandwiched between the cladding and the substrate, and is configured to transmit an optical signal. The core layer is the channel for transmitting an optical signal.

To transmit optical signals of different wavelengths, an implementation manner is implemented by setting thicknesses of one or more layers of the cladding, the core layer, and the substrate. Certainly, thicknesses of the layers may be different due to different manufacturing materials of the PLC 10. For example, for transmitting an optical signal of a 1550 nm band, if the PLC 10 is made of silica, a thickness of the core layer is set to about 4 to 8 microns, a thickness of the substrate is set to about 12 μm, and a thickness of the cladding is set to about 19 μm.

Figure 3:
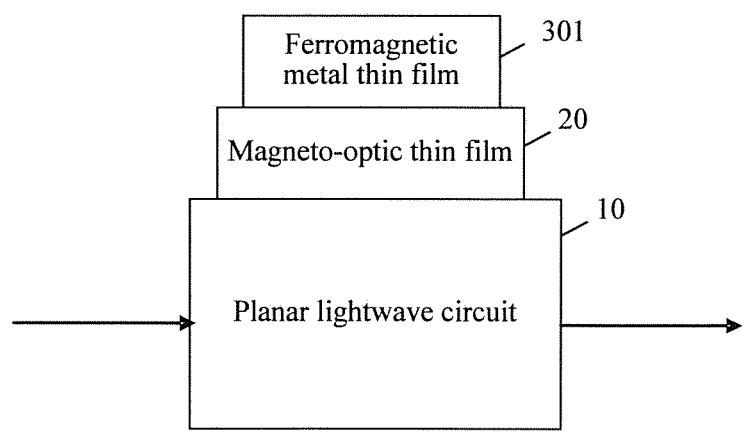
FIG. 3 is a schematic structural diagram of an optical isolator according to an embodiment of the present invention.

In this embodiment, the magneto-optic thin film 20 is a medium that can produce a magneto-optic effect. The material of the magneto-optic thin film 20 is a garnet, or the like. The metal thin film 30 with a magnetic field may have multiple implementation manners. As an implementation manner, the metal thin film 30 with a magnetic field is a ferromagnetic metal thin film. As shown in FIG. 3, a ferromagnetic metal thin film 301, as a metal thin film that can generate a magnetic field, is disposed on the magneto-optic thin film 20.

Figure 4:
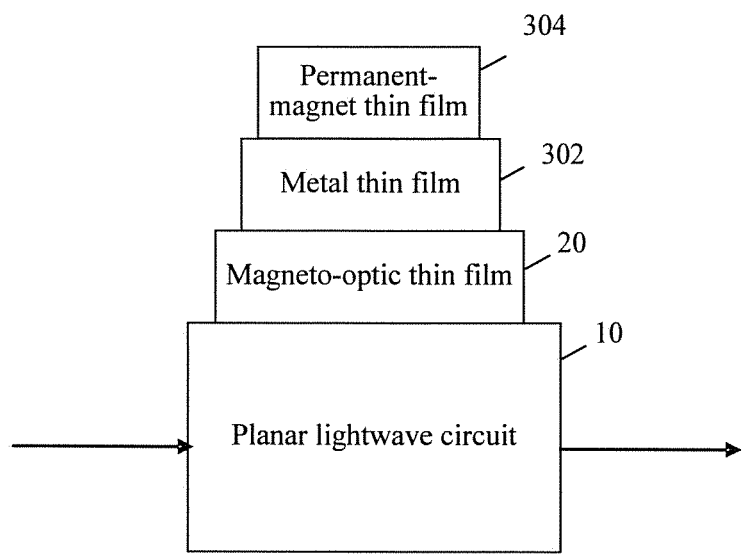
FIG. 4 is a schematic structural diagram of an optical isolator according to an embodiment of the present invention.

As another implementation manner, the metal thin film 30 with a magnetic field consists of a metal thin film 302 and a permanent-magnet thin film 304. As shown in FIG. 4, the metal thin film 302 is disposed on the magneto-optic thin film 20, and the permanent-magnet thin film 304 is disposed on the metal thin film 302.

The material of the metal thin film 302 includes one or more of gold, silver, and copper. The metal thin film 302 may also be other metals.

When the metal thin film 30 with a magnetic field is the ferromagnetic metal thin film 301, on a surface of the ferromagnetic metal thin film 301, there are free electrons of a high density and in uniform distribution. When stimulated by an electric field, the free electrons may be distributed in a non-uniform density according to a direction of the electric field. That is, when stimulated by the electric field, the free electrons generate a transient induced electric dipole. When the induced electric dipole performs electric dipole oscillation in a collective manner at a specific frequency, a surface plasmon polariton (SPP) is formed. According to the Maxwell's theory, a transverse magnetic (TM) wave, as an optical signal, can be transmitted along a surface of a metal. However, a transverse electric (TE) wave, also as an optical signal, may not be transmitted along a surface of a metal. Owing to a surface plasmon (SP) effect, the PLC 10 in this embodiment allows a TM wave to pass. By adjusting a parameter of the ferromagnetic metal thin film 301, when a TM wave in a forward direction matches an SPP mode, the two are transformed into each other in the PLC 10 and therefore transmitted forward. For a TM wave in a reverse direction, owing to polarization non-reciprocity, a dielectric constant of a metal changes, and a matching condition for the TM wave in a reverse direction and the SPP mode is destroyed, so that the TM wave in a reverse direction cannot enter the PLC 10, thereby achieving an objective of isolating light.

When the metal thin film 30 with a magnetic field includes the metal thin film 302 and the permanent-magnet thin film 304, when transmitted in the PLC 10, a TM wave transmitted in a forward direction passes through the magneto-optic thin film 20 and excites an SP effect on a surface of the metal thin film 302. In this way, the TM wave and an SPP mode are transformed into each other in the PLC 10, so that the TM wave passes through the PLC 10 smoothly. However, owing to polarization non-reciprocity of the magneto-optic thin film 20, a TM wave in a reverse direction and the SPP mode may not be transformed into each other, so that the TM wave in a reverse direction cannot pass through the PLC 10.

In the optical isolator according to this embodiment, when a TM wave is transmitted in a forward direction, the TM wave and an SPP mode are transformed into each other, and the TM wave is transmitted smoothly in a PLC. When a TM wave is transmitted in a reverse direction, the two modes may not be transformed into each other, so that the TM wave in a reverse direction may not be transmitted in the PLC, thereby implementing a function of isolating light.

Figure 5:
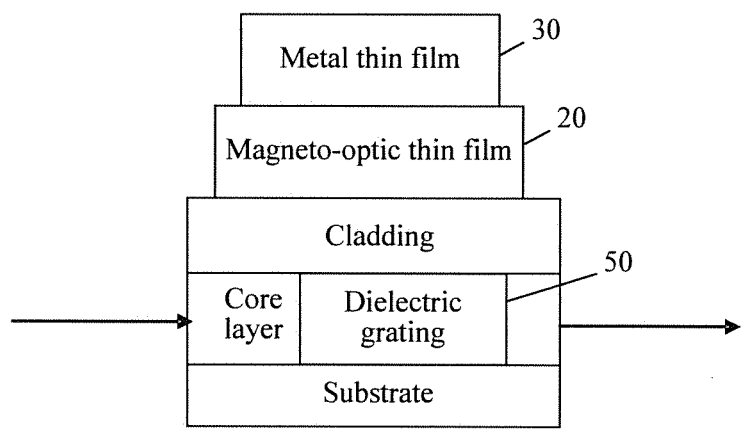
FIG. 5 is a schematic structural diagram of an optical isolator according to an embodiment of the present invention.

To further reduce insertion losses of the optical isolator and further improve isolation of the optical isolator, a dielectric grating may also be added to the optical isolator provided above. The dielectric grating may be disposed in the channel for transmitting the optical signal of the PLC 10, and may be disposed in the core layer of the PLC 10. Because the dielectric grating is disposed in the optical isolator, not only can a TM wave be isolated, but also a TE wave can be isolated, as shown in FIG. 5.

When a TM wave transmitted in a forward direction passes through a dielectric grating 50, because the dielectric grating 50 destroys matching between an SPP mode and the TM wave, more TM waves are transformed into SPP modes. The SPP modes are transformed into TM waves after crossing the dielectric grating 50, and the TM waves enter the core layer of the PLC 10 and are transmitted. So that the insertion losses can be further reduced. For a TM wave in a reverse direction, owing to polarization non-reciprocity, a dielectric constant of the metal thin film 30 (the ferromagnetic metal thin film 301 in FIG. 3 or the metal thin film 302 in FIG. 4) changes, and a matching condition for the SPP mode and the TM wave is destroyed, so that the TM wave in a reverse direction cannot enter the PLC 10. Even if a small quantity of TM waves and TE waves in a reverse direction enter the PLC 10, the TM waves and the TE waves are reflected by the dielectric grating 50, so that isolation of the optical isolator can be further improved.

In the optical isolator according to this embodiment, insertion losses of the optical isolator can be further reduced by adding a dielectric grating to a channel for transmitting an optical signal, thereby further improving isolation of the optical isolator.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical isolator, comprising:
   a planar lightwave circuit configured with a channel for transmitting an optical signal;
   a magneto-optic thin film disposed on a cladding of the planar lightwave circuit, wherein a plane on which the magneto-optic thin film is located is parallel to the channel for transmitting the optical signal;
   a metal thin film disposed on the magneto-optic thin film so that the magneto-optic thin film is between the metal thin film and the cladding; and
   a permanent-magnet thin film disposed on the metal thin film so that the metal thin film is between the magneto-optic thin film and the permanent-magnet thin film.

2. The optical isolator according to claim 1, wherein the planar lightwave circuit comprises the cladding, a substrate and a core layer located between the cladding and the substrate, and the core layer is the channel for transmitting an optical signal.

3. The optical isolator according to claim 1, wherein the metal thin film comprises a ferromagnetic metal thin film.

4. The optical isolator according to claim 1, wherein the metal thin film comprises any one or combination of gold, silver and copper.

5. The optical isolator according to claim 1, wherein the planar lightwave circuit comprises silica.

6. The optical isolator according to claim 1, wherein the planar lightwave circuit comprises any one or combination of lithium niobate ($LiNbO_3$), III-V semiconductor compound, silicon on an insulator, silicon oxynitride (SiON) and high molecular polymer.

7. The optical isolator according to claim 6, wherein the III-V semiconductor compound comprises any one or a combination of indium phosphide (InP) or gallium arsenide (GaAs).

8. The optical isolator according to claim 1, wherein a dielectric grating is configured in the channel for transmitting the optical signal.

9. The optical isolator according to claim 2, wherein a dielectric grating is disposed on the core layer.

* * * * *